(12) United States Patent
Libinson

(10) Patent No.: US 11,787,181 B2
(45) Date of Patent: Oct. 17, 2023

(54) PRINTING HEAD FOR NON-CARTESIAN INKJET PRINTING

(71) Applicant: Stratasys Ltd., Rehovot (IL)

(72) Inventor: Alexander Libinson, Holon (IL)

(73) Assignee: Stratasys Ltd., Rehovot (IL)

( * ) Notice: Subject to any disclaimer, the term of this patent is extended or adjusted under 35 U.S.C. 154(b) by 149 days.

(21) Appl. No.: 17/419,799

(22) PCT Filed: Dec. 30, 2019

(86) PCT No.: PCT/IL2019/051430
§ 371 (c)(1),
(2) Date: Jun. 30, 2021

(87) PCT Pub. No.: WO2020/141510
PCT Pub. Date: Jul. 9, 2020

(65) Prior Publication Data
US 2022/0072859 A1    Mar. 10, 2022

Related U.S. Application Data

(60) Provisional application No. 62/786,468, filed on Dec. 30, 2018.

(51) Int. Cl.
*B41J 2/14*        (2006.01)
*B29C 64/112*    (2017.01)

(52) U.S. Cl.
CPC ........... *B41J 2/1433* (2013.01); *B29C 64/112* (2017.08); *B41J 2002/14338* (2013.01); *B41J 2002/14419* (2013.01); *B41J 2002/14475* (2013.01)

(58) Field of Classification Search
CPC ............ B41J 2/1433; B41J 2002/14338; B41J 2002/14419; B41J 2002/14475; B29C 64/122
See application file for complete search history.

(56) References Cited

U.S. PATENT DOCUMENTS

| | | |
|---|---|---|
| 6,259,962 B1 | 7/2001 | Gothait |
| 6,569,373 B2 | 5/2003 | Napadensky |
| 6,658,314 B1 | 12/2003 | Gothait |
| 6,850,334 B1 | 2/2005 | Gothait |

(Continued)

FOREIGN PATENT DOCUMENTS

| | | |
|---|---|---|
| EP | 2667987 | 12/2013 |
| JP | 2008-036836 | 2/2008 |

(Continued)

OTHER PUBLICATIONS

International Preliminary Report on Patentability dated Jul. 15, 2021 From the International Bureau of WIPO Re. Application No. PCT/IL2019/051430. (8 Pages).

(Continued)

*Primary Examiner* — Jason S Uhlenhake

(57) ABSTRACT

A printing head for inkjet printing comprises: a manifold having a channel for holding material formulation therein; and an array of controllable nozzles fluidly connected to the channel for dispensing the material formulation by inkjet technology. In an embodiment, the array of nozzles is characterized by a pitch that varies along the array. In an embodiment, the nozzles are arranged over a curved line engaging a horizontal plane.

20 Claims, 12 Drawing Sheets

(56) References Cited

U.S. PATENT DOCUMENTS

| | | |
|---|---|---|
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,479,510 B2 | 1/2009 | Napadensky et al. |
| 7,500,846 B2 | 3/2009 | Eshed et al. |
| 7,962,237 B2 | 6/2011 | Kritchman |
| 9,031,680 B2 | 5/2015 | Napadensky |
| 2008/0158295 A1 | 7/2008 | Suzuki et al. |
| 2010/0191360 A1 | 7/2010 | Napadensky et al. |
| 2017/0151722 A1 | 6/2017 | Prasad et al. |
| 2017/0173886 A1 | 6/2017 | Menchik et al. |
| 2017/0305138 A1* | 10/2017 | Donaldson ............ B29C 64/227 |
| 2917/0305138 | 10/2017 | Donaldson et al. |
| 2018/0154443 A1 | 6/2018 | Milshtein et al. |

FOREIGN PATENT DOCUMENTS

| | | | |
|---|---|---|---|
| JP | 2008036836 A * | 2/2008 | |
| WO | WO 2016/009426 | 1/2016 | |
| WO | WO 2020/141510 | 7/2020 | |
| WO | WO 2020/141515 | 7/2020 | |

OTHER PUBLICATIONS

International Search Report and the Written Opinion dated Mar. 12, 2020 From the International Searching Authority Re. Application No. PCT/IL2019/051430. (11 Pages).

International Search Report and the Written Opinion dated Mar. 30, 2020 From the International Searching Authority Re. Application No. PCT/IL2019/051435. (11 Pages).

\* cited by examiner

PRINTING HEAD FOR NON-CARTESIAN INKJET PRINTING

RELATED APPLICATIONS

This application is a National Phase of PCT Patent Application No. PCT/IL2019/051430 having International filing date of Dec. 30, 2019, which claims the benefit of priority of U.S. Provisional Patent Application No. 62/786,468 filed on Dec. 30, 2018. The contents of the above applications are all incorporated by reference as if fully set forth herein in their entirety.

FIELD AND BACKGROUND OF THE INVENTION

The present invention, in some embodiments thereof, relates to inkjet printing and, more particularly, but not exclusively, to a printing head for non-Cartesian inkjet printing, and method of using same.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, and International Patent Application Publication No. WO2016/009426, all of the same Assignee, the contents of which are hereby incorporated by reference.

SUMMARY OF THE INVENTION

According to an aspect of some embodiments of the present invention there is provided a printing head for inkjet printing. The printing head comprises: a manifold having a channel for holding material formulation therein; and an array of controllable nozzles fluidly connected to the channel for dispensing the material formulation by inkjet technology; wherein the array of nozzles is characterized by a pitch that varies along the array.

According to some embodiments of the invention the array has a proximal end and a distal end, and wherein the pitch gradually decreases away from the proximal end.

According to some embodiments of the invention the printing head is for use in a printing system with a relative rotary motion between a tray and the printing head, wherein the proximal end is to be positioned closer to a center of the relative rotary motion than the distal end, and wherein the pitch is inversely proportional to a distance of a respective nozzle from the proximal end.

According to some embodiments of the invention each nozzle comprises a cell cavity receiving the material formulation from the channel, and wherein a dimension of the cell cavities along the array is non-uniform.

According to some embodiments of the invention each nozzle comprises a cell cavity receiving the material formulation from the channel, wherein the cell cavities are separated by walls, and wherein thicknesses of the walls are non-uniform along the array.

According to an aspect of some embodiments of the present invention there is provided a printing head for inkjet printing. The printing head comprises: a manifold having a channel for holding material formulation therein; and an array of controllable nozzles fluidly connected to the channel for dispensing the material formulation by inkjet technology; wherein the nozzles are arranged over a curved line engaging a horizontal plane.

According to some embodiments of the invention a pitch characterizing the array is such that when a projection of the pitch onto a horizontal axis of the head varies along the array.

According to some embodiments of the invention the array has a proximal end and a distal end, and wherein the projection of the pitch gradually decreases away from the proximal end.

According to some embodiments of the invention the printing head is for use in a printing system with a relative rotary motion between a tray and the printing head, wherein the proximal end is to be positioned closer to a center of the relative rotary motion than the distal end, and wherein the projection of the pitch is inversely proportional to a distance of a respective nozzle from the proximal end.

According to some embodiments of the invention the array is characterized by a pitch that is constant along the array.

According to some embodiments of the invention the array is characterized by a pitch that varies along the array.

According to some embodiments of the invention the printing head is for use in a printing system with a relative rotary motion between a tray and the printing head, wherein the proximal end is to be positioned closer to a center of the relative rotary motion than the distal end, and wherein the curved line is characterized by a varying inclination angle $\theta$ with respect to a vertical plane perpendicular to the horizontal plane, the variation being such that a cosine of the inclination angle is inversely proportional to a distance of a respective nozzle from the proximal end.

According to an aspect of some embodiments of the present invention there is provided a printing system. The printing system comprises the printing head as delineated above and optionally and preferably as further detailed below.

According to some embodiments of the invention the system is configured for two-dimensional printing.

According to some embodiments of the invention the system is configured for three-dimensional printing.

According to some embodiments of the invention the system is configured to dispense the formulation over a non-Cartesian grid.

According to some embodiments of the invention the non-Cartesian grid is a polar grid.

According to some embodiments of the invention the system comprises a controller configured to establish a rotary motion between the printing head and a working surface on which the formulation is dispensed.

According to some embodiments of the invention the controller is also configured to shift the printing head along a radial direction and to rotate the head along a vertical direction, in a manner than each nozzle experiences a position shift in both the radial and the rotation direction.

According to some embodiments of the invention the rotation of the head is selected to minimize an average change in a position of the nozzle due to the radial shift.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
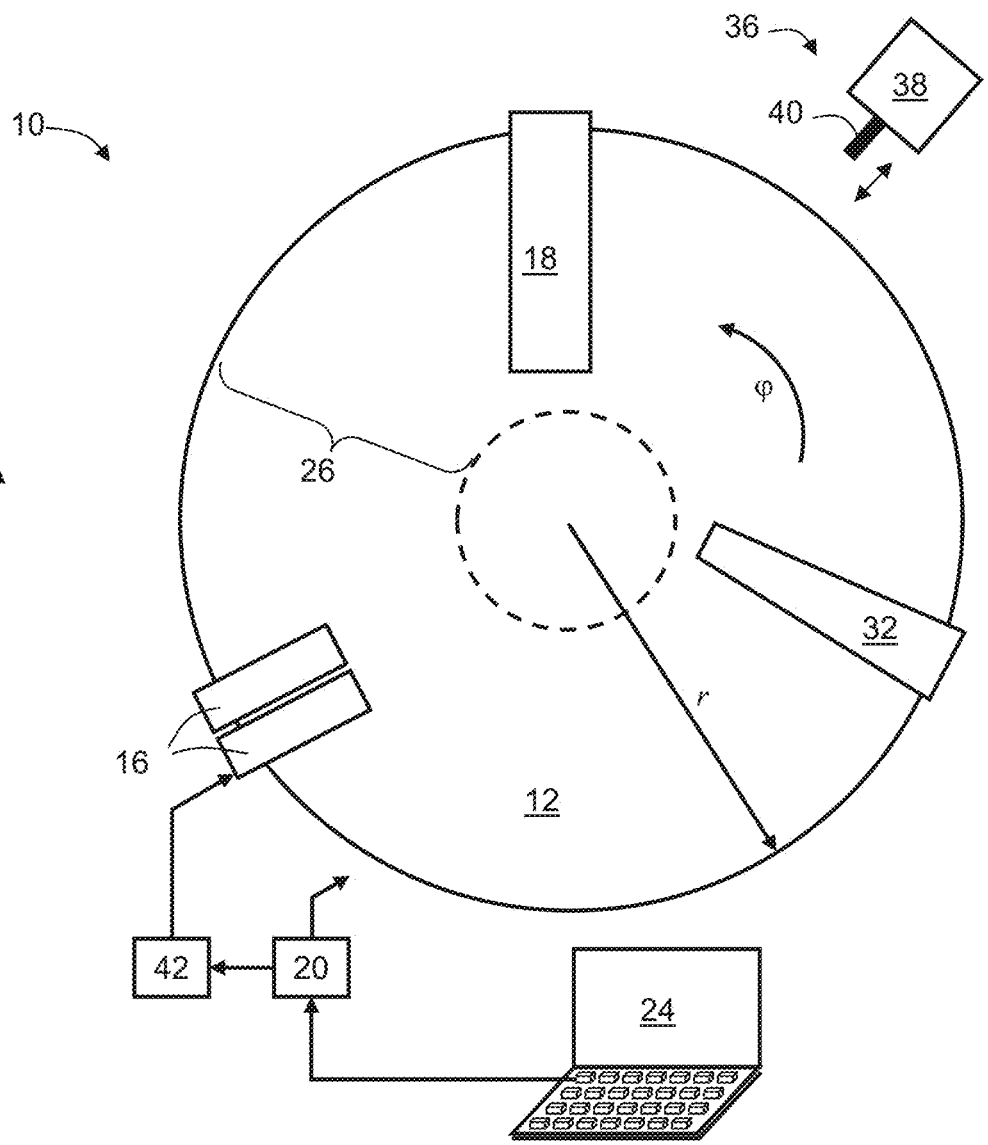
FIGS. 1A, 1B and 1C are schematic illustrations of an additive manufacturing system according to some embodiments of the invention.

The present invention, in some embodiments thereof, relates to inkjet printing and, more particularly, but not exclusively, to a printing head for non-Cartesian inkjet printing, and method of using same.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The technique of the present embodiments can be used to print two-dimensional patterns or manufacture three-dimensional objects based on computer object data. When used for manufacturing three-dimensional objects, the technique of the present embodiments form a plurality of layers in a configured pattern corresponding to the shape of the objects.

While the embodiments below are described with a particular emphasis to three-dimensional printing, it is to be understood that the printing head and the method described herein are useful also for two-dimensional printing, for example, using different type of dispensed formulations, a fewer number of layers (e.g., a single layer), and a different working surface (e.g., a sheet of paper, or a planar or non-planar surface of a product onto which a two-dimensional pattern, such as, but not limited to, an image, is to be printed).

The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a printing head having one or more arrays of nozzles to deposit building material formulation in layers on a supporting structure. The AM apparatus thus dispenses building material formulation in target locations which are to be occupied and leaves other target locations void. The apparatus typically includes a plurality of arrays of nozzles, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different modeling material formulations, each material formulation from a different array of nozzles (belonging to the same or different printing heads) of the AM apparatus. In some embodiments, two or more such arrays of nozzles that dispense different modeling material formulations are both located in the same printing head of the AM apparatus. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are both located in separate the same printing head.

In printing systems in which the printing heads reciprocally move above the working surface along straight lines, droplets of material formulation are dispensed over a Cartesian grid. Such systems are referred to herein as "Cartesian printing systems" to indicate that the droplets are dispensed according to a Cartesian system of coordinates.

In Cartesian printing systems, the printing heads use dispensing timing controlled by the same clock pulse for all the nozzles. For Cartesian printing systems, this provides uniform separation between the drops dispensed at the adjacent clock for all dispensing nozzles of a nozzle array. This is illustrated in FIG. 4.

The term "separation between the drops" is used to describe the distance between adjacent formulation droplets dispensed along the scanning direction. In FIG. 4, which relates to Cartesian printing, the scanning direction (e.g. the printing direction) is denoted as the x direction. The separation between the drops in this case is the inverse of the linear density of the drops in the scanning direction, which linear density is interchangeably referred to as the spatial resolution.

Figure 4:
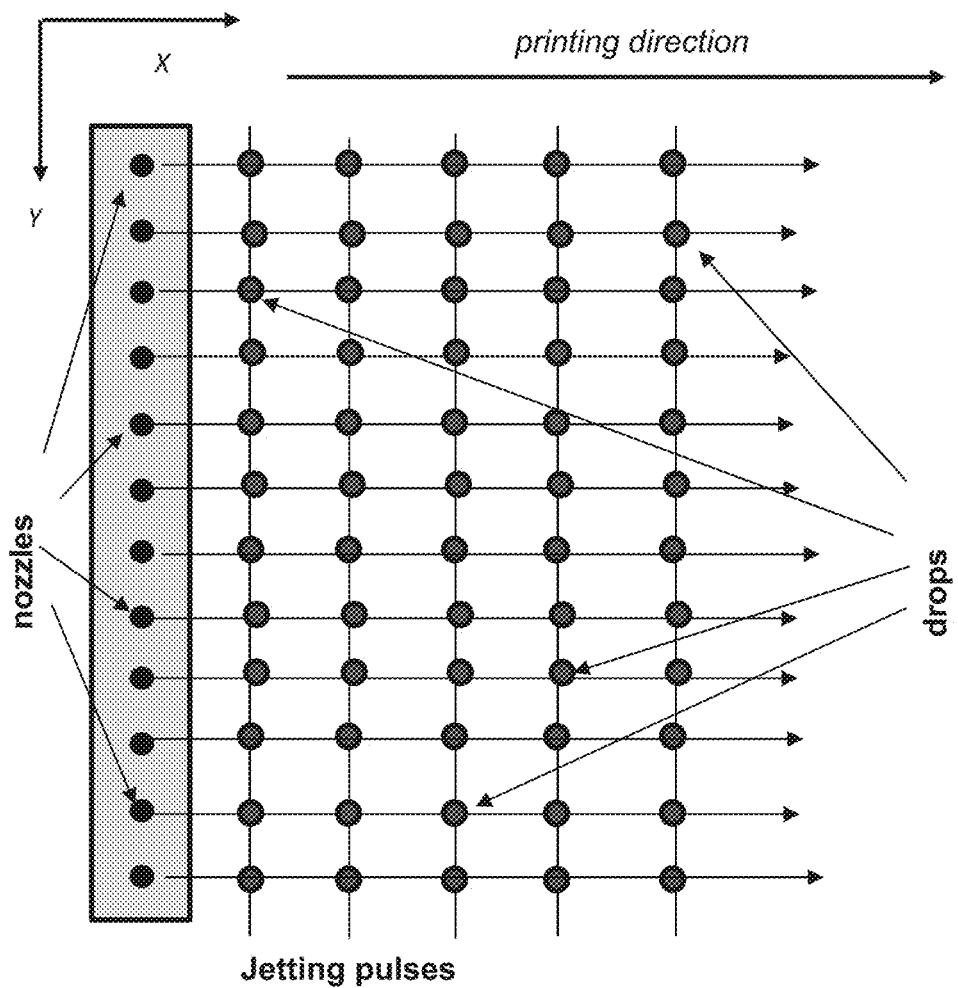
FIG. 4 is a schematic representation of a pattern of droplet deposition from an array of inkjet printing head nozzles in a Cartesian inkjet printing system.

Cartesian printing systems dispense formulation when the printing block moves with the constant linear velocity along the scanning direction, while each nozzle array is aligned along the indexing direction, shown in FIG. 4 as the y direction. Therefore, the dispensing frequency is the same for all nozzles providing uniform resolution over all the nozzles of the printing head.

The present embodiments relate to an inkjet printing system in which the droplets of material formulation are dispensed over a non-Cartesian grid. This system is referred to herein as "non-Cartesian printing system" to indicate that the droplets are dispensed according to a non-Cartesian system of coordinates. Typically, the non-Cartesian system of coordinates is a polar system of coordinates, but other non-Cartesian systems of coordinates are contemplated, such as, but not limited to, parabolic system of coordinates, hyperbolic system of coordinates, Beltrami system of coordinates, Poincaré system of coordinates, and Lobachevsky system of coordinates.

The present embodiments contemplate both inkjet printing for the additive manufacturing of three-dimensional objects, and inkjet printing for dimensional printing of two-dimensional objects such as text or images.

Figure 1B:
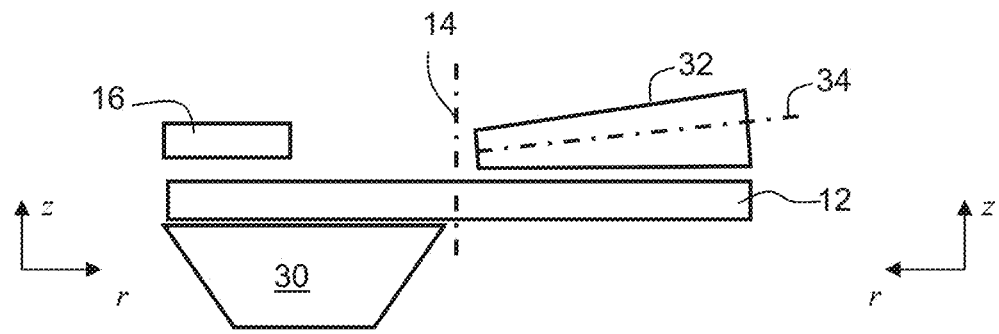
Figure 1C:
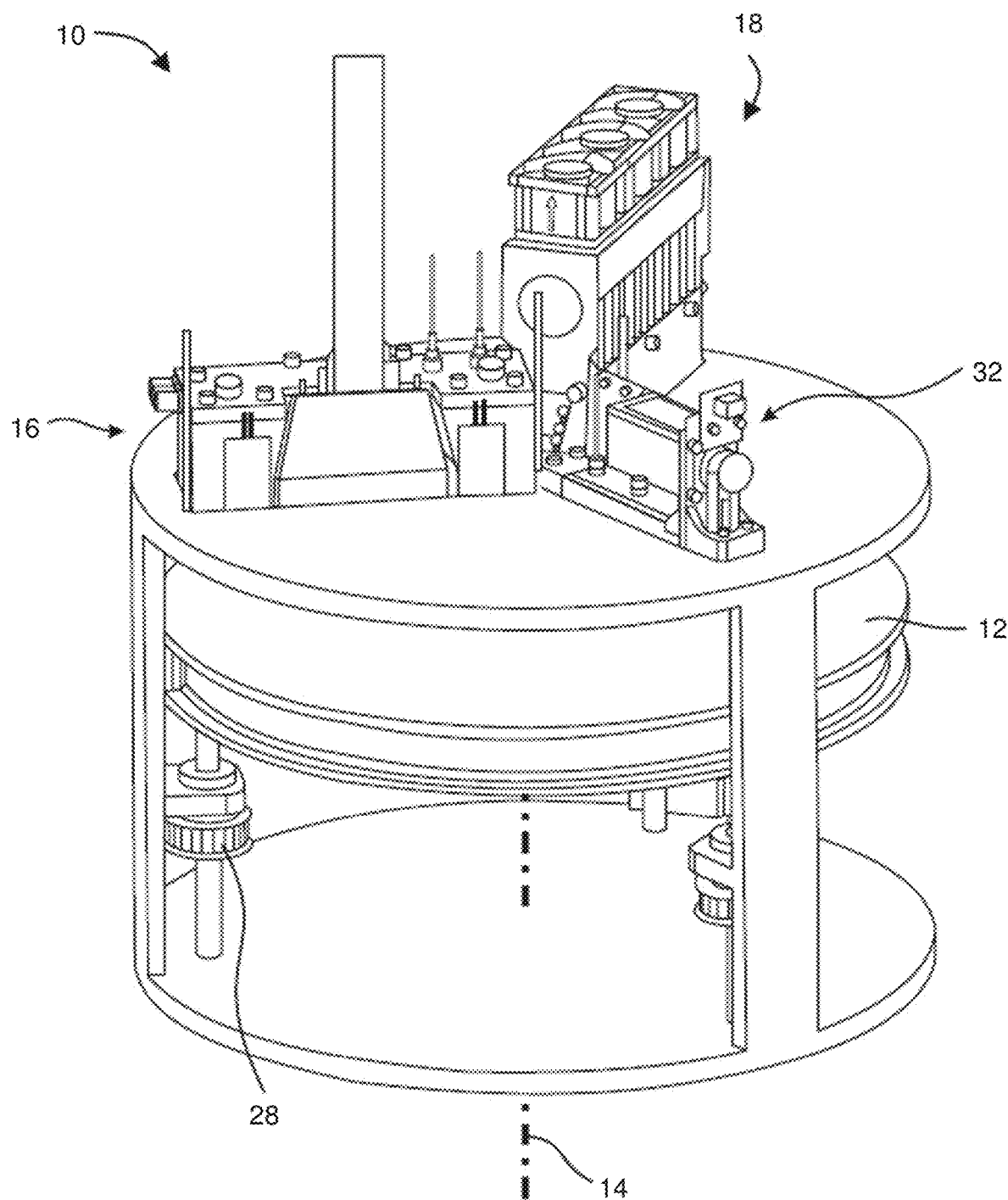

A representative and non-limiting example of a non-Cartesian printing system 10 suitable for AM of an object according to some embodiments of the present invention is illustrated in FIGS. 1A-C. FIGS. 1A-C illustrate a top view (FIG. 1A), a side view (FIG. 1B) and an isometric view (FIG. 1C) of system 10.

Figure 2A:
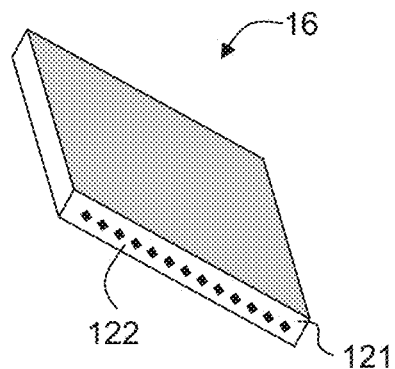
FIGS. 2A, 2B and 2C are schematic illustrations of printing heads according to some embodiments of the present invention.
Figure 2B:
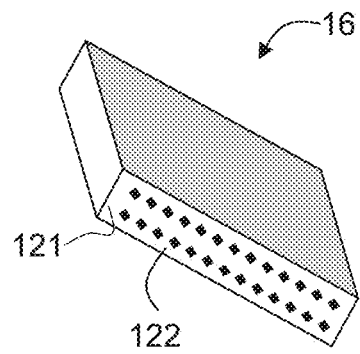
Figure 2C:
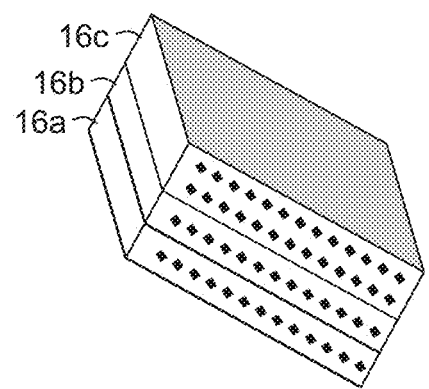

In the present embodiments, system 10 comprises a tray 12 and a plurality of inkjet printing heads 16, each having one or more arrays of nozzles 122 with respective one or more pluralities of separated nozzles, typically mounted on an orifice plate 121, as illustrated in FIGS. 2A-C described below. The material used for the three-dimensional printing is supplied to heads 16 by a building material supply system 42. Preferably, but not obligatorily, system 10 is a three-dimensional inkjet printing system, in which case the printing heads dispense the building material formulations via inkjet technology.

Each printing head is optionally and preferably fed by one or more building material formulations. The material formulations are supplied to heads 16 by a building material supply system 42. System 42 may optionally include a temperature control unit (e.g., a temperature sensor and/or a heating device), and a material formulation level sensor. To dispense the building material formulation, a voltage signal is applied to the printing heads to selectively deposit droplets of material formulation via the printing head nozzles, for example, as in piezoelectric inkjet printing technology. The dispensing rate of each head depends on the number of nozzles, the type of nozzles and the applied voltage signal rate (frequency). Such printing heads are known to those skilled in the art of solid freeform fabrication.

Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to the working surface (e.g., tray 12) and pointing in the direction of relative motion between the printing head and the working surface is referred to as the scanning direction. A direction parallel to the working surface, and pointing in the direction of a nozzle array (typically perpendicular to the scanning direction) is referred to as the indexing direction. A direction perpendicular to the working surface is referred to herein as the vertical direction, and is denoted z.

For a polar system of coordinates, the scanning direction is interchangeably referred to as the azimuthal direction $\varphi$, and the indexing direction is interchangeably referred to as the radial direction r.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1A tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented approximate radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position pi, and another head can be oriented radially and positioned at azimuthal position $\varphi_2$. In this example, the azimuthal offset between the two heads is $\varphi_1 - \varphi_2$, and the angle between the linear nozzle arrays of the two heads is also $\varphi_1 - \varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer building is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, an OBJ File format (OBJ), a 3D Manufacturing Format (3MF), Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of the drops to be printed in each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

The transformation of coordinates allows three-dimensional printing over a rotating tray.

Figure 3A:
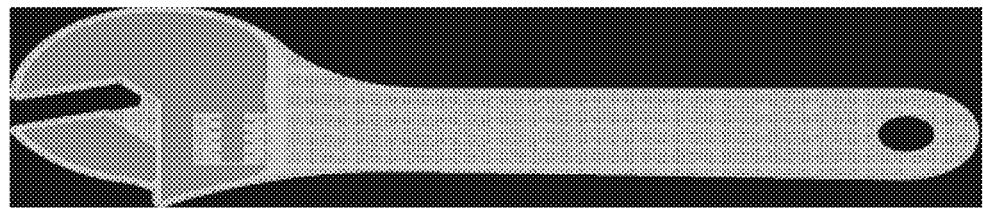
FIGS. 3A and 3B are schematic illustrations demonstrating coordinate transformations according to some embodiments of the present invention.
Figure 3B:
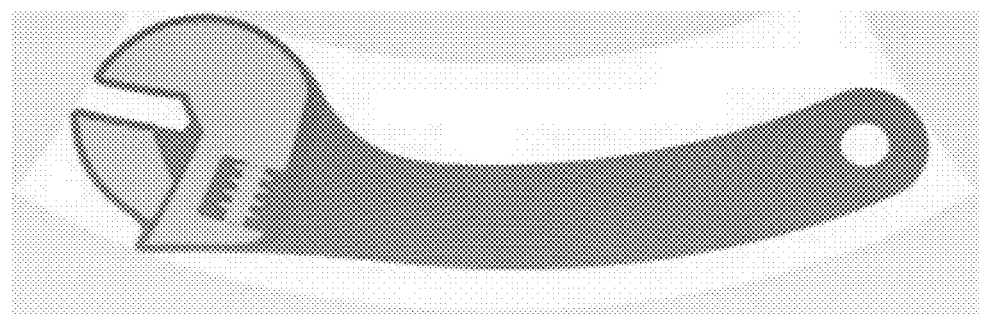

In Cartesian printing systems, the printing resolution is the same at any point over the tray, provided the dispensing rates of the heads are uniform, as illustrated in FIG. 4. In system 10, unlike Cartesian printing systems, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1B).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different arrays of nozzles (belonging to the same or different printing head). These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations may be formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application No. 20100191360, the contents of which are hereby incorporated by reference.

The problem of non-uniform spatial resolution will now be discussed in greater detail.

Figure 5:
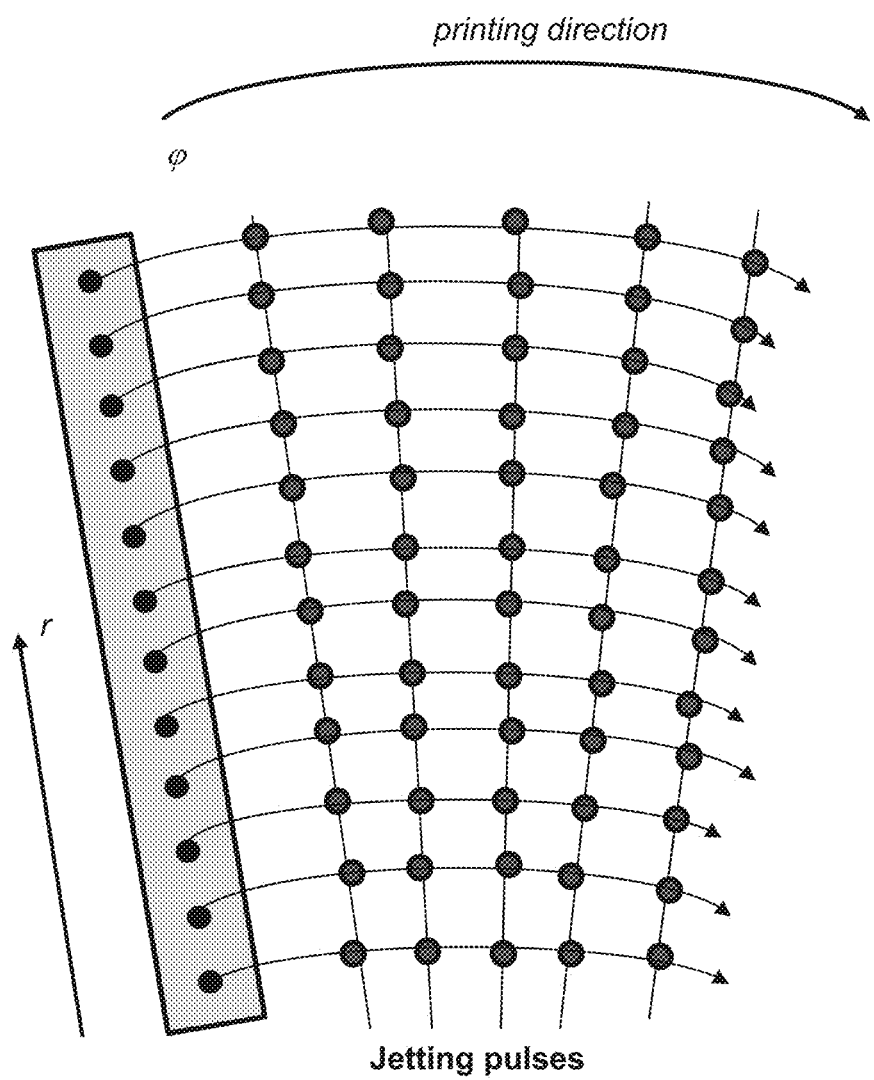
FIG. 5 is a schematic representation of a pattern of droplet deposition from an array of inkjet printing head nozzles in a non-Cartesian inkjet printing system.

In non-Cartesian printing systems (e.g., a non-Cartesian AM system, such as, but not limited to, system 10, or a non-Cartesian two-dimensional printing system for printing of 2D objects such as image or text), the scanning direction is curved (for example, along the azimuthal direction φ, in case the printing system employs a polar system of coordinates), since the relative motion between the printing heads and the working surface (e.g., tray 12) is along a curved line. This is shown schematically in FIG. 5.

In this case, uniform timing of dispensing by all nozzles of the arrays results in different drop density in the curved scanning direction and may also result in non-uniform spatial density of the dispensed drops. For two-dimensional printing, such non-uniform spatial density may lead to non-uniform coloring. For three-dimensional printing, this causes non-uniform layer thickness, as well as non-uniform coloring.

Several solutions have been proposed to the problem of non-uniform density in rotary printing systems.

One solution is to configure the nozzle array of the dispensing heads such that nozzles that are at different distances from axis 14 dispense the building material at difference dispensing rates. Typically, in this solution, nozzles that are closer to axis 14 (or to the center of tray 12) dispense the building material at a lower dispensing rate than nozzles that are farther from axis 14.

The present inventor found that the solution referred to above is not optimal, since known printing heads provide stable and controlled dispensing only in several narrow ranges of the dispensing frequency, which typically relates to characteristic resonances of the dispensing heads. The present inventor has therefore realized that changing the effective dispensing frequency may affect the mass and velocity of the dispensed droplets, which in turn reduces the quality of the printed patterns (for two-dimensional printing) or printed objects (for three-dimensional printing). The present inventor found a hardware solution for the problem of non-uniform resolution in non-Cartesian printing systems, which hardware solution can be used for uniformly dispensing the formulation by the different nozzles in a non-Cartesian printing system.

The hardware solution relates to a construction of a nozzle array of an inkjet printing head. Preferably, the printing head is configured for dispensing building material formulations suitable for additive manufacturing, and employed for additive manufacturing of a three-dimensional object. Alternatively, the printing head can be configured for dispensing ink suitable for inkjet printing of two-dimensional objects. For conciseness of presentation, the embodiments below are described mainly for the preferred case of AM of a three-dimensional object.

Figure 6:
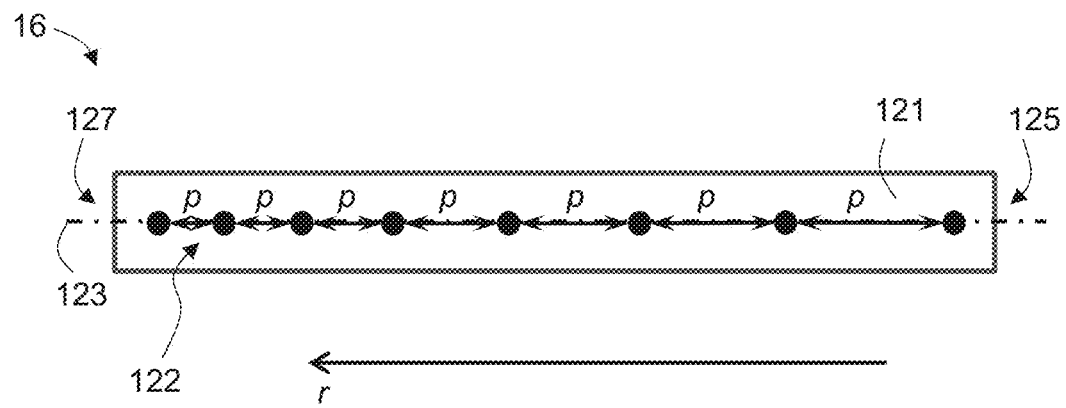
FIG. 6 is a schematic illustration of an array of nozzles in an orifice plate of a printing head, according to some embodiments of the present invention.

FIG. 6 is a schematic illustration of an array 122 of nozzles formed in an orifice plate 121 which can be provided on a printing head (e.g., head 16) according to some embodiments of the present invention. Shown in FIG. 6 is a horizontal axis 123 which is a straight line passing in the middle of orifice plate 121 from a proximal end 125 to a distal end 127 of orifice plate 121. When head 16 is mounted on a printing system (e.g., AM system 10) the horizontal axis 123 is preferably parallel to the indexing direction. During the operation of the printing system, the linear speed of the relative motion between proximal end 125 and the tray is the smallest, and the linear speed of the relative motion between distal end 127 and the tray is the largest. For example, when a rotary system (e.g., system 10) is used, proximal end 125 is closer to axis 14 than distal end 127. In the embodiment illustrated in FIG. 6, the pitch p (distance between adjacent nozzles) of array 122 is non-uniform along horizontal axis 123, so that once head 16 is mounted on a printing system the pitch p is non-uniform along the indexing direction (e.g., the radial direction r).

Preferably, the array pitch p gradually decreases away from proximal end 125, so that once the head is mounted on the printing system the array pitch p gradually decreases as a function of the indexing direction (away from the vertical axis 14 of system 10).

Such a configuration ensures that the drop density in the scanning direction is different for different locations along the indexing direction. The present inventor found that this can compensate for the non-uniform drop of non-Cartesian pointing system, even without varying the effective dispensing frequency as a function of the indexing direction.

In embodiments in which the printing system employs a polar system of coordinates, the variation of the pitch p as a function of the radial coordinate r, can be set to be inversely proportional to r. Formally:

$$p(r) = K/r$$

where K is a preselected constant. Typically, but not necessarily, K is selected using a predetermined condition of a preselected nominal pitch $p^n$ at a preselected nominal radial position $r^n$. In this embodiment, K can be calculated as:

$$K = p^n \times r^n$$

The nominal radial position r″ and pitch p″ can correspond to the nozzle furthest from the rotation center.

Non-uniform array pitch p can be achieved in more than one way.

Figure 11A:
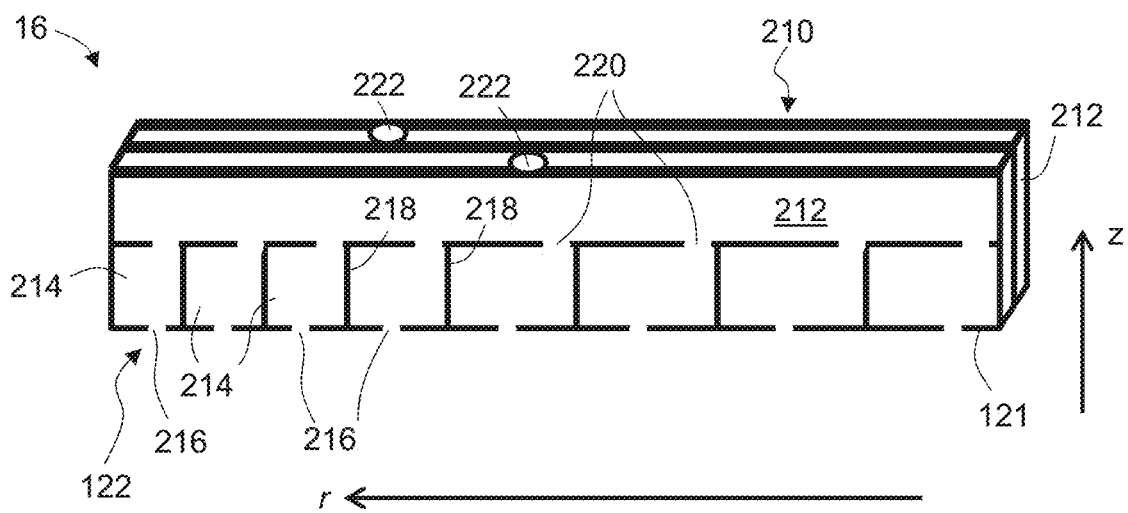
FIGS. 11A and 11B are schematic illustration of an inkjet printing head having one or more channels in embodiments of the invention in which the head has a non-uniform array pitch.
Figure 11B:
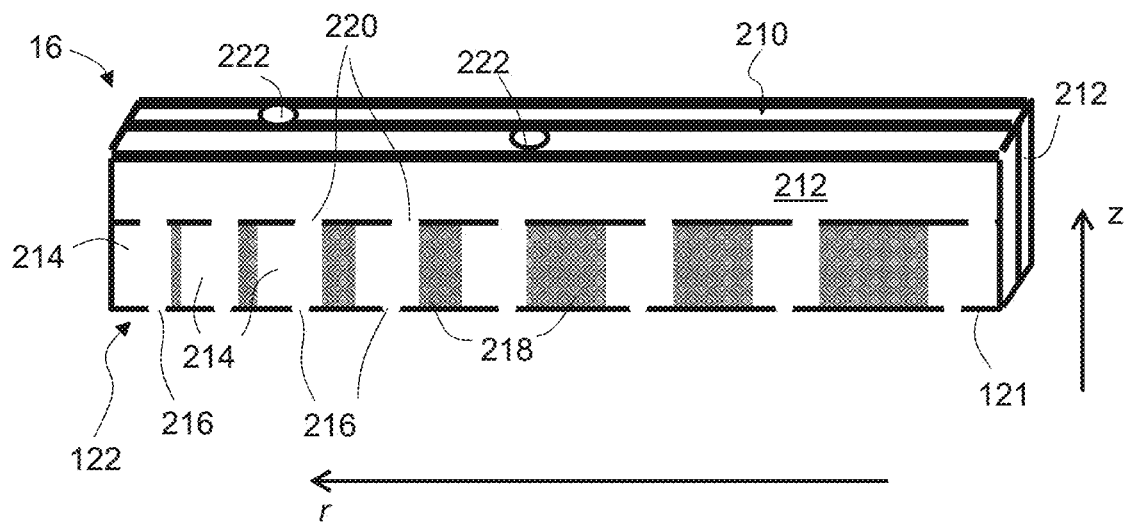

FIGS. 11A and 11B illustrate inkjet printing head 16 in embodiments of the present invention in which head 16 has a non-uniform array pitch. Head 16 comprises a manifold 210 having one or more channels 212. Each of channels 212 has an inlet port 222 for receiving a liquid material formulation and conveying it to a separate printing head nozzle array 122, for dispensing of the respective formulation by the respective nozzle array 122. When there is more than one channel 212, all channels are separated from each other such that there is no fluid communication therebetween, allowing each channel to receive a different formulation through the respective inlet port 222 and convey it to a different array 122.

The nozzle array 122 is mounted on a printing head orifice plate 121, and comprises a plurality of nozzles, each having a cell cavity 214 for holding an amount of material formulation for dispensing, and an outlet port 216 through which the material formulation is dispensed. The cell cavities 214 of all the nozzles in a particular nozzle array 122 are separated by walls 218, but are typically all fluidly connected to a particular and separate channel 212 of the head's manifold 210, for example, via a plurality of outlet ports 220 of the respective channel 212, each outlet port 220 providing fluid communication between the channel and one of the cell cavities 214. When the dimensions of cell cavities 214 and the thicknesses of all the separating walls 218 in a particular nozzle array 122 are the same, the array pitch p is uniform. According to some embodiments of the present invention, a non-uniform array pitch p is ensured by providing a nozzle array 122 in which the dimensions of the cell cavities 214, specifically the dimension along the indexing direction (the radial direction r, in the present example), are non-uniform. These embodiments are illustrated in FIG. 11A. Non-uniform array pitch p can alternatively or additionally be ensured by providing a nozzle array 122 in which the thicknesses of the separating walls 218 are non-uniform. These embodiments are illustrated in FIG. 11B.

Also contemplated is a combination of the embodiment shown in FIG. 11A and the embodiment shown in FIG. 11B, wherein the dimensions of the cell cavities 214 along the indexing direction are non-uniform, and the thicknesses of the separating walls 218 are also non-uniform.

Figure 7:
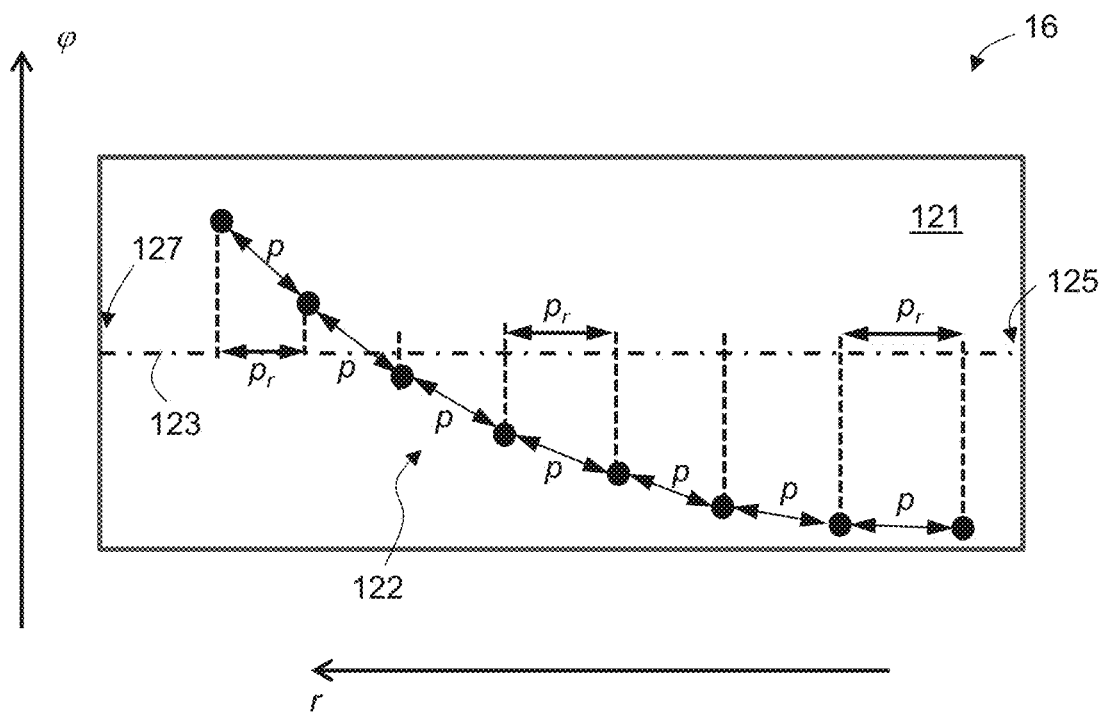
FIG. 7 is a schematic illustration of an array of nozzles in which the nozzles are arranged over a curved line in a horizontal plane spanned by an indexing direction r and an azimuthal direction φ, according to some embodiments of the present invention.

FIG. 7 is a schematic illustration of an orifice plate 121, of a printing head 16 in embodiments of the invention in which the nozzles of array 122 are arranged in a curved line over orifice plate 121, in a horizontal plane spanned by the indexing direction (e.g., the radial direction r) and the scanning direction (e.g., the azimuthal radial direction φ). Similarly to FIG. 6, FIG. 7 also illustrates horizontal axis 123 with the proximal 125 and distal 127 ends. When the head shown in FIG. 7 is mounted on a printing system (e.g., AM system 10) the horizontal axis 123 is preferably parallel to the indexing direction, in a manner that during the operation of the printing system, the linear speed of the relative motion between proximal end 125 and the tray is the smallest, and the linear speed of the relative motion between distal end 127 and the tray is the largest. For example, when a rotary system (e.g., system 10) is used, proximal end 125 is closer to axis 14 than distal end 127.

In the embodiment illustrated in FIG. 7, the projection $p_r$ of the pitch on horizontal axis 123 varies along horizontal axis 123, so that once head 16 is mounted on the printing system, the projection $p_r$ of the pitch varies as a function of the indexing direction. Preferably, the projection $p_r$ gradually decreases away from proximal end 125. The pitch p of array 122 (the Euclidian distance between adjacent nozzles along the curved line forming array 122) optionally and preferably remains uniform along the array. However, this need not necessarily be the case. Provided that the projection $p_r$ varies as a function of the indexing direction, the pitch p can also be non-uniform along array 122.

In embodiments in which the printing system employs a polar system of coordinates, the curved line over which the nozzles are arranged can be defined by the parametric equation:

$$C/r = \cos\theta,$$

where C is a preselected constant, and θ is an inclination angle formed between a tangent to the curved line and a plane perpendicularly to a plane engaged by the curved line. Typically, but not necessarily, C is a preselected nominal radial position r″, which in some embodiments of the present invention can correspond to the nozzle furthest from the rotation center.

In the embodiments in which the pitch varies along the indexing direction (FIG. 6), as well as in the embodiments in which the nozzles of array 122 are arranged along a curved line (FIG. 7), a small shift of the projection of the pitch onto the working surface may be effected by shifting the printing head perpendicularly to the scanning direction (e.g., along the r direction in FIG. 1A). Such a shift can be compensated, for example, by rotating the printing head at a predetermined angle about the vertical axis 14, thereby effecting a shift in the positioning at a direction ρ which is a combination of the indexing direction and the scanning direction (e.g., along a direction ρ having an r component as well as a φ component, in the exemplified illustration of FIG. 1A). Preferably, the rotation of the printing head about the vertical axis 14 is at an angle β selected to reduce or minimize the average absolute value of the difference between the projection of the pitch on the indexing direction before the rotation, and the p-component of the projection of the pitch on the indexing direction after the rotation.

Figure 12A:
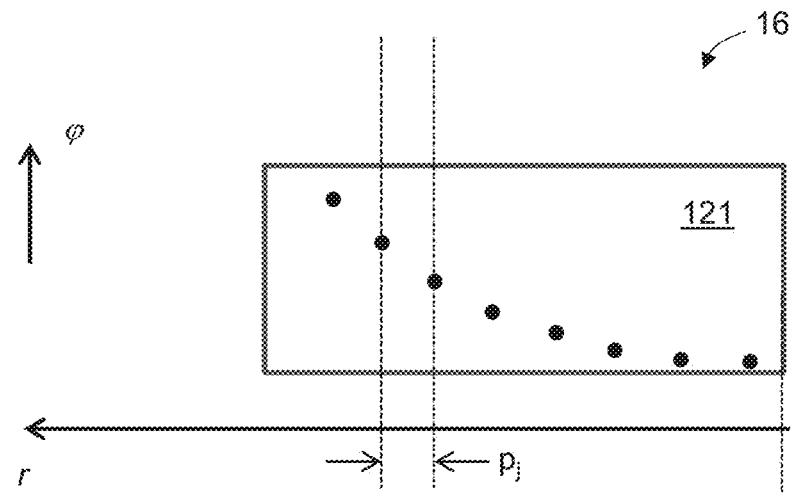
FIGS. 12A and 12B are schematic illustration of a procedure in which a printing head is rotated to compensate for local changes in an array pitch due to a shift of the head's radial position, according to some embodiments of the present invention.
Figure 12B:
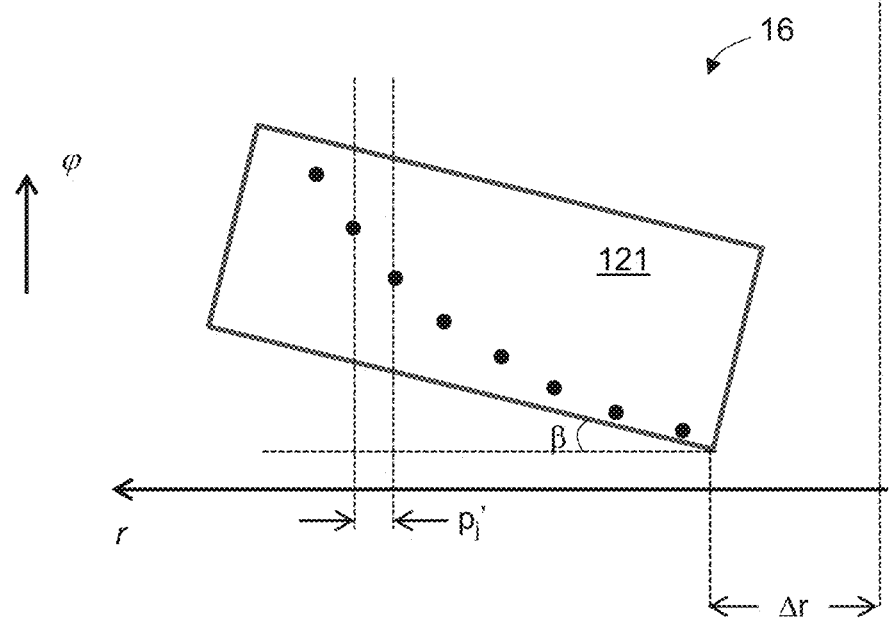

This procedure is illustrated in FIGS. 12A and 12B, for the case of a polar coordinate system in which the indexing direction is the radial direction r, the scanning direction is the azimuthal radial direction φ, and the nozzles are arranged over a curved line over the orifice plate 121 of head 16 in the horizontal plane. FIG. 12A illustrates head 16 before it has been shifted along the radial direction. A projection on the radial direction of the pitch between the jth and (j+1)th nozzles is denoted on FIG. 12A by $p_j$. FIG. 12B illustrates head 16 after a Δr shift of head 16 along the radial direction and a rotation at an angle β relative to the radial direction about the vertical axis 14 (not show, perpendicular to the plane of the drawing). The projection on the radial direction of the pitch between the jth and (j+1)th nozzles is denoted on FIG. 12B by $p_j'$. As shown, $p_j'$ is smaller than $p_j$. The absolute value of the difference between $p_j$ and $p_j'$, once averaged over all the nozzles of the array, is defined as an objective function F, as follows:

$$F(\beta) = \langle |p_j - p_j'| \rangle_j,$$

where the notation $\langle \ldots \rangle_j$ denotes averaging over j. According to preferred embodiments of the present invention, the angle β is selected such as to reduce or minimize the objective function F, or, in other words, to reduce the absolute value of the difference between the projection on the radial direction of the pitch of the jth nozzle before the rotation and the projection on the radial direction of the pitch of the jth nozzle after the rotation, once averaged over all the nozzles of the array.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find support in the following examples.

Examples

Reference is now made to the following examples, which together with the above descriptions illustrate some embodiments of the invention in a non-limiting fashion.

Polar Coordinate System

As an example of the ability of the technique of the present embodiments to reduce non-uniformity in spatial resolution, a three-dimensional printing system employing a rotating tray and polar system of coordinates (e.g., system 10) will be discussed.

Figure 8:
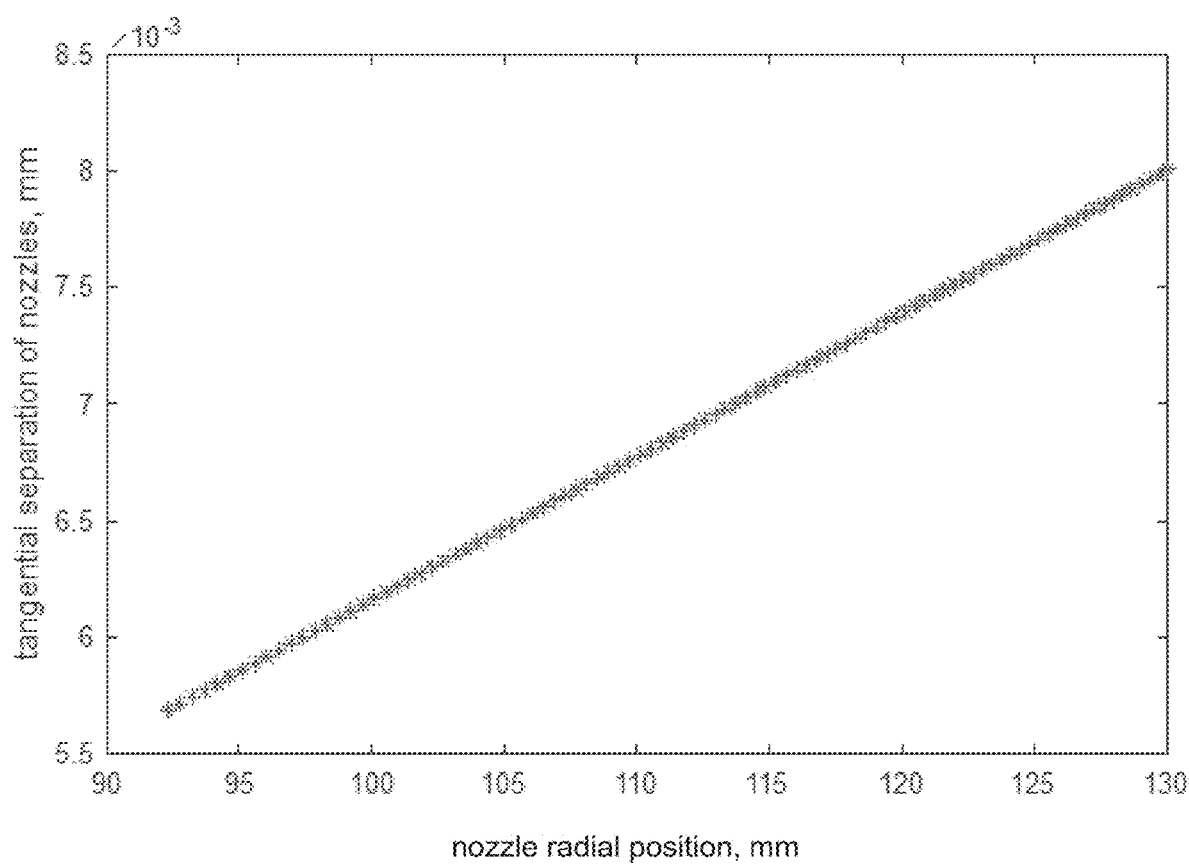
FIG. 8 is a graph showing tangential separation between dispensed drops according to some embodiments of the present invention.

In this example, it is assumed that the dispensing frequency is the same for all nozzles of the array, and corresponds to the same angular step of rotating tray. The printing heads are aligned approximately in the radial direction r. The scanning direction is the azimuthal direction $\varphi$. For non-curved nozzle array and uniform array pitch, the drop density in the scanning direction $\varphi$ for different nozzles of the array decreases as the radial distance of the nozzle from the rotation axis increases. This is due to the circular motion of the tray, wherein the linear velocity of the nozzles with respect to the tray increases with the radial direction (nozzles that are farther from the axis move faster). As a result, the drop density in the azimuthal direction varies along the radial direction. FIG. 8 shows the separation between the drops in mm, as a function of the radial position in mm. FIG. 8 corresponds to maximal drop separation in azimuthal direction as about 8 micrometer and maximal radial distance of 130 mm.

The drop separation in the azimuthal direction $L_\varphi(r)$ at radial position r may be calculated using a nominal drop separation value $L_\varphi''$ at a certain nominal radial position $r''$ according to EQ. 1:

$$L_\varphi(r) = L_\varphi'' \times r''/r \qquad (1)$$

In order to provide an approximately constant amount of dispensed material per area unit of the tray over the full range of the printable radial positions, the drop density can be decreased with the radial direction. This results in an effective change of the dispensing frequency (as averaged over several adjacent dispensing events).

Known printing heads provide stable and controlled dispensing only in several narrow ranges of dispensing frequencies, which typically relate to characteristic resonances of the dispensing heads. The inventor found that increasing the dispensing frequency by a factor of, e.g., 1.4 (corresponding to radial distances of the nozzle spanning from r=90 mm to r=130 mm), is problematic.

In accordance with some embodiments of the present invention, the pitch p (distance between adjacent nozzles) of the array 122 is non-uniform along the radial direction r (see FIG. 6). The dependence of p on r can be set to be:

$$p(r) = p'' \times r''/r \qquad (2)$$

where $p''$ is a preselected nominal pitch at a preselected nominal radial position $r''$. The nominal radial position $r''$ and pitch $p''$ can correspond to the nozzle furthest from the rotation center. In the present example $r''$ was set to be 130 mm.

Figure 9:
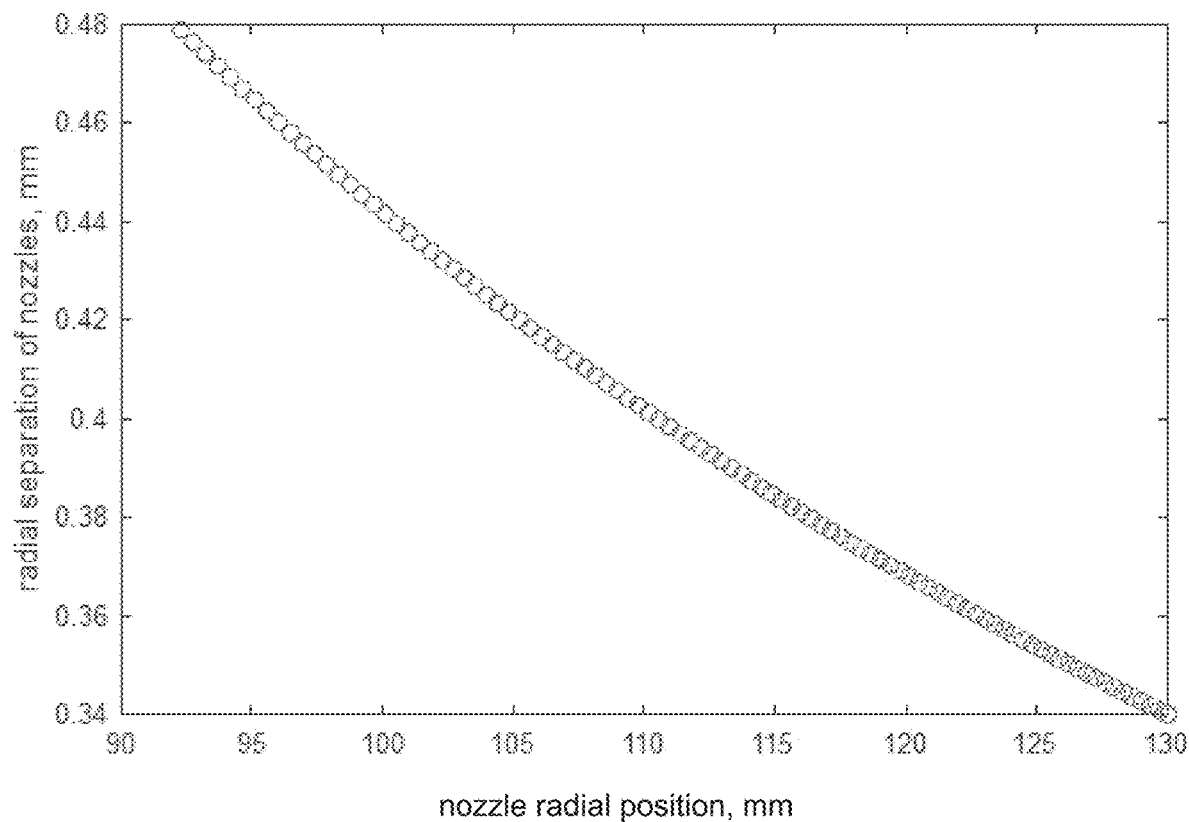
FIG. 9 is a graph showing a variation in nozzle pitch along a radial direction for an exemplary array of nozzles, according to some embodiments of the present invention.

FIG. 9 shows the variation of the pitch along the radial direction for an exemplary array with 96 nozzles spanning from r=92 mm to r=130 mm.

In accordance with some embodiments of the present invention, the nozzles of the array are arranged over a curved line in a plane spanned by the radial direction r and the vertical direction z (FIG. 7). The curved line can be described by the parametric equation:

$$\theta = \arccos(r''/r) \quad (3)$$

where $r''$ is a preselected nominal radial position. The nominal radial position $r''$ can correspond to the nozzle furthest from the rotation center. In the present example $r''$ was set to be 130 mm.

Figure 10:
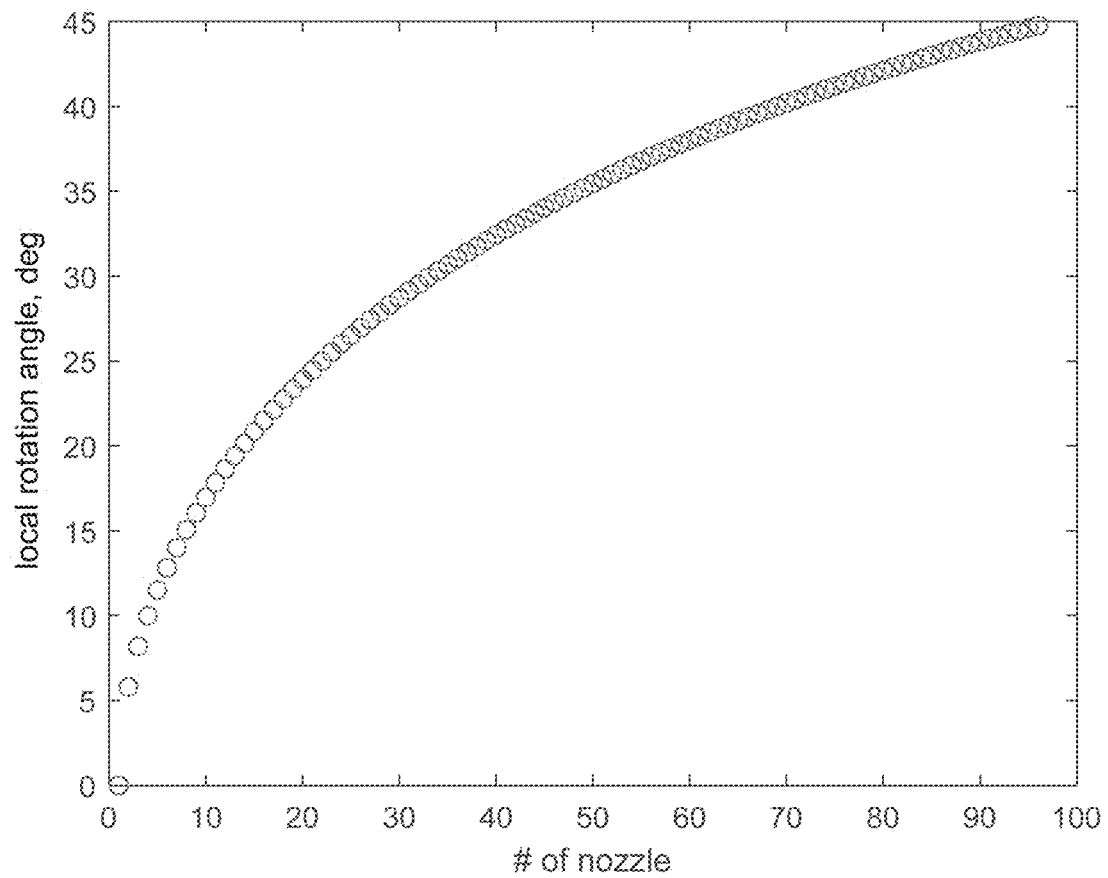
FIG. 10 is a graph showing variation of a rotation angle along the radial direction for an exemplary array of nozzles, according to some embodiments of the present invention.

FIG. 10 shows the variation of the inclination angle θ along the radial direction for an exemplary array with 96 nozzles spanning from r=92 mm to r=130 mm.

In some embodiments, the position of the printing heads is slightly shifted along the indexing direction by an amount of Δr. This is done to decrease the appearance of the non-uniformity of dispensing different nozzles of the same head by spatial averaging over Δr (a procedure known as "nozzle scattering"). Adjustment of the radial separation of the nozzles to these small changes of the radial position of the printing block may be done by reducing, more preferably minimizing, the average change of the nozzle's position. One way to ensure such a reduction is to rotate the heads by the angle β with respect to Z-axis, according to EQ. 4, below $$\{|p_j - p_j'|\} \to \min \quad (4)$$

where the curly brackets denote averaging over all nozzles of the head, $p_j$ denotes the separation between the nozzles j and (j+1) of the array before the shift in the head's radial position, and $p_j'$ denotes the separation between the same nozzles after the head has been shifted along the r direction.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A printing head for inkjet printing, comprising:
   a manifold having a channel for holding material formulation therein; and
   an array of controllable nozzles fluidly connected to said channel for dispensing the material formulation by inkjet technology, each nozzle comprising a cell cavity receiving said material formulation from said channel;
   wherein a dimension of said cell cavities along said array is non-uniform and wherein said array of nozzles is characterized by a pitch that varies along said array.

2. The printing head of claim 1, wherein said array has a proximal end and a distal end, and wherein said pitch gradually decreases away from said proximal end.

3. The printing head of claim 2, for use in a printing system with a relative rotary motion between a tray and the printing head, wherein said proximal end is to be positioned closer to a center of said relative rotary motion than said distal end, and wherein said pitch is inversely proportional to a distance of a respective nozzle from said proximal end.

4. The printing head according to claim 1, wherein said cell cavities are separated by walls, and wherein thicknesses of said walls are non-uniform along said array.

5. A printing system, comprising the printing head according to claim 1.

6. The system of claim 5, being configured for two-dimensional printing.

7. The system of claim 5, being configured for three-dimensional printing.

8. The system according to claim 5, being configured to dispense said formulation over a non-Cartesian grid.

9. The system according to claim 8, wherein said non-Cartesian grid is a polar grid.

10. The system according to claim 8, comprising a controller configured to establish a rotary motion between said printing head and a working surface on which said formulation is dispensed.

11. The system according to claim 10, wherein said controller is also configured to shift said printing head along a radial direction and to rotate said head along a vertical direction, in a manner than each nozzle experiences a position shift in both said radial and said rotation direction.

12. The system according to claim 11, wherein said rotation of said head is selected to minimize an average change in a position of said nozzle due to said radial shift.

13. A printing head for inkjet printing by a printing system with a relative rotary motion between a tray and the printing head, comprising:
   a manifold having a channel for holding material formulation therein; and
   an array of controllable nozzles fluidly connected to said channel for dispensing the material formulation by inkjet technology, wherein a proximal end of said array is to be positioned closer to a center of said relative rotary motion than a distal end of said array;
   wherein said nozzles are arranged over a curved line engaging a horizontal plane, said curved line being characterized by a varying inclination angle θ with respect to a vertical plane perpendicular to said horizontal plane, said variation being such that a cosine of said inclination angle is inversely proportional to a distance of a respective nozzle from said proximal end of said array.

14. The printing head of claim 13, wherein a pitch characterizing said array is such that when a projection of said pitch onto a horizontal axis of the head varies along said array.

15. The printing head according to claim 13, wherein said array is characterized by a pitch that is constant along said array.

16. The printing head according to claim 13, wherein said array is characterized by a pitch that varies along said array.

17. A printing head for inkjet printing, comprising:
   a manifold having a channel for holding material formulation therein; and
   an array of controllable nozzles fluidly connected to said channel for dispensing the material formulation by inkjet technology, each nozzle comprising a cell cavity receiving said material formulation from said channel;
   wherein said cell cavities are separated by walls, wherein thicknesses of said walls are non-uniform along said array, and wherein said array of nozzles is characterized by a pitch that varies along said array.

18. A printing system, comprising the printing head according to claim 17.

19. A printing head for inkjet printing by a printing system with a relative rotary motion between a tray and the printing head, comprising:
   a manifold having a channel for holding material formulation therein; and
   an array of controllable nozzles fluidly connected to said channel for dispensing the material formulation by inkjet technology, said array having a proximal end and a distal end, said proximal end to be positioned closer to a center of the relative rotary motion than said distal end, and being;
   wherein said nozzles are arranged over a curved line engaging a horizontal plane, wherein a pitch characterizing said array is such that a projection of said pitch onto a horizontal axis of the head varies along said array, and gradually decreases away from said proximal end in a manner that it is inversely proportional to a distance of a respective nozzle from said proximal end.

20. A printing system, comprising the printing head according to claim 19.

* * * * *